Feb. 9, 1943.  A. R. BLANDFORD  2,310,905
ELECTRICAL SWITCHING APPARATUS
Filed June 2, 1939  2 Sheets-Sheet 1

WITNESSES:  INVENTOR
Alfred R. Blandford
ATTORNEY

Patented Feb. 9, 1943

2,310,905

UNITED STATES PATENT OFFICE 2,310,905

ELECTRICAL SWITCHING APPARATUS

Alfred R. Blandford, Stafford, England, assignor to The English Electric Company Limited, London, England, a British company Application June 2, 1939, Serial No. 277,005
In Great Britain June 3, 1938

19 Claims. (Cl. 200—148)

The invention relates to electrical switching apparatus and more particularly to switching apparatus comprising a circuit interrupter and an associated disconnecting or isolating switch electrically connected in series therewith.

Certain types of electric circuit breakers are such that it is inadvisable to depend solely on them for keeping the circuit open and the apparatus isolated after the interruption of the circuit. Thus, for example, in certain high-tension circuit breakers in which arc extinction is effected by a jet of fluid and in particular a blast of air, the separation of the contacts must be comparatively small in order to get a high fluid velocity; accordingly, unless mechanism be provided for giving further separation of the contacts after the extinction of the arc, some separate means of disconnection or isolation should be provided. Again in some types of circuit breaker which are biased to the closed position and opened by the temporary application of a counter-force overcoming the biasing force it is desirable to remove the counter-force after the circuit has been interrupted. In particular in some types of air-blast circuit breakers where the air pressure is also used to separate the contacts, both of the above conditions hold—viz.; the separation is small and it is desirable to cut off the air pressure as soon as the arc is extinguished. When the air pressure is cut off the circuit breaker recloses, the circuit being kept open by a disconnecting switch in series with the circuit breaker.

With many types of circuit breaker it is preferable that reclosing of the circuit should be effected by some other switch, such as a disconnecting switch in series with the circuit breaker, this being particularly so with sealed up fluid-blast circuit breakers such as those considered in the last paragraph.

With the object of meeting the requirement set forth in the preceding paragraph, the present invention comprises, in combination, a circuit breaker, a disconnecting switch in series therewith, means for applying temporarily a force to open the circuit breaker which remains open after the removal of that force, independent operating means for opening the disconnecting switch immediately after the opening of the circuit breaker and for subsequently reclosing the switch as desired and means responsive to the initial closing movement of the disconnecting switch for causing the circuit breaker to reclose just before the disconnecting switch closes. Such a combination in particular meets all the requirements when the circuit breaker is of the kind discussed above.

Mechanical interconnecting means is provided between the disconnecting switch and the circuit breaker for holding the latter open until the switch begins to close and for then causing reclosing of the circuit breaker. This interconnecting means may take either of two forms. One form comprises the combination with a spring urging the circuit breaker to the closed position of means mechanically actuated by the disconnecting switch to relieve the circuit breaker contact of the spring pressure when the switch is open and to reapply the spring pressure during the initial closing movement of the switch. Another and preferred form comprises the combination with a spring permanently tending to close the circuit breaker, of latching means which hold the circuit breaker open against the spring pressure after the opening force has been removed, and means mechanically moving with the disconnecting switch to actuate the latching means during the initial closing movement of the disconnecting switch and thereby release the movable part of the circuit breaker and allow the latter to close under the spring pressure.

The disconnecting switch can be of the ordinary air break type—i. e., a switch with all its contacts open to the atmosphere, such a switch having the advantage that its contacts are fully exposed for inspection and cleaning.

The novel features that are considered characteristic of the invention are set forth in particular in the appended claims. The invention itself, however, both as to structure and operation, together with additional objects and advantages thereof will be best understood from the following detailed description of several embodiments thereof when read in conjunction with the accompanying drawings, in which:

Figure 1:
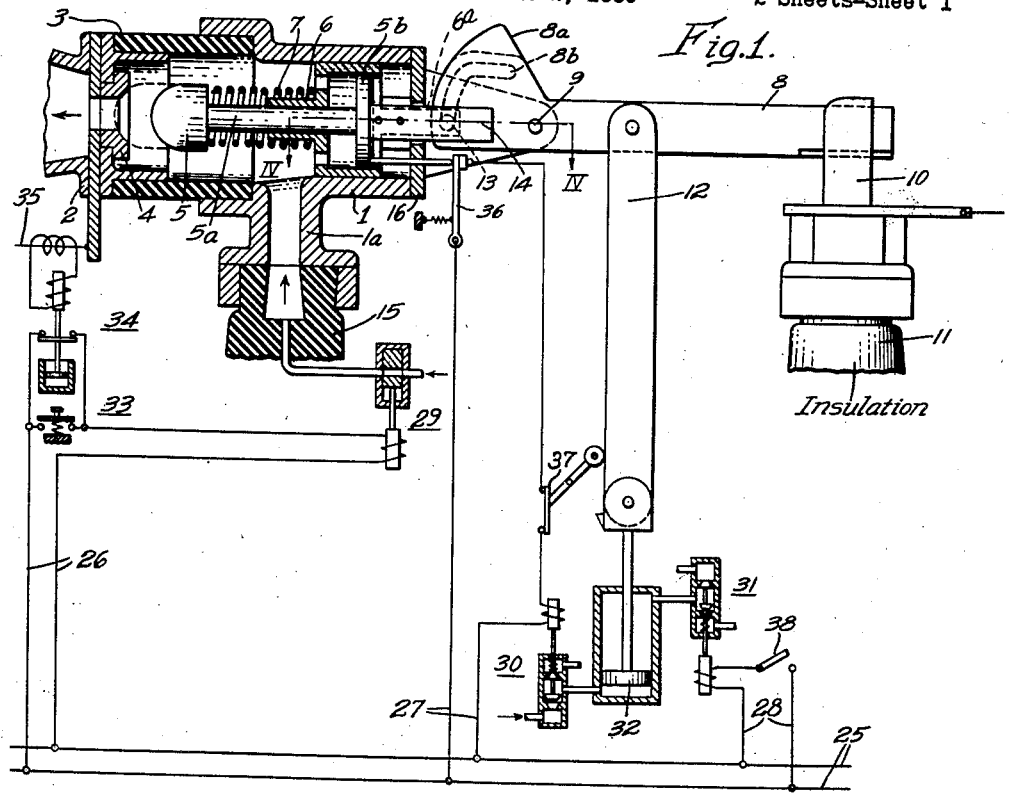
Figure 1 is a fragmentary view, partly in section, of a circuit breaker and disconnecting switch constructed and combined in accordance with one embodiment of the invention, the breaker being shown in the open position and the switch in closed position.
Figure 2:
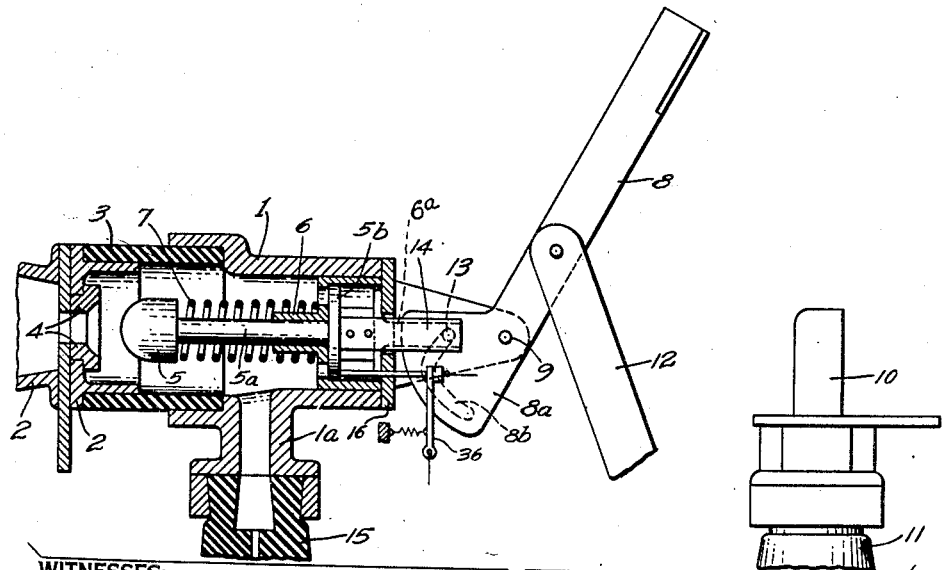
Fig. 2 is a fragmentary view similar to Fig. 1 showing the disconnecting switch in open position holding the circuit breaker open.

In the form of the invention according to Figs. 1 and 2 a circuit breaker sealed up in a substantially gas-tight chamber is adapted to be opened by application of air pressure thereto. The chamber is made up of the hollow cylindrical member 1 with a hollow inlet boss 1a, the tubular outlet member 2, and the insulating sleeve 3 connecting the parts 1 and 2. One of the contacts of the circuit breaker is fixed and comprises a flanged sleeve 4 mounted on the outlet member 2. The other contact 5 is movable and in the form of a head on the end of the stem 5a which is free to slide in the cylinder 6 to interrupt the circuit by separation of the contacts 4 and 5. A spring 7 compressed between the contact 5 and the cylinder 6 can apply sufficient pressure to keep the contact 5 in engagement with the fixed contact 4 until air pressure is applied to open the breaker. A piston 5b secured to or integral with the stem 5a is free to slide in an enlarged part of the cylinder 6. The whole device is mounted on the hollow insulator 15. The compressed air supply may conveniently pass in known manner through the interior of the insulator 15 and the interior of the boss 1a into the cylinder 6. The pressure on the piston 5b is sufficient to overcome the force of the spring 7 and to move the piston in the cylinder to withdraw the contact 5 from the contact 4. The separation of the contacts is comparatively small and the arc is extinguished by the blast of air passing from the interior of the chamber through the hollow contact 4 to the outlet member 2.

Since the contacts are spring biased to the closed position, the cutting off of the air pressure would allow the breaker to reclose in the absence of other means for preventing reclosure. After the opening of the circuit breaker, however, a disconnecting switch in series therewith is opened. This switch comprises the knife blade 8 pivoted at 9 and adapted to engage the fixed contact 10 mounted on the insulator 11. The switch is actuated by the link 12 which may for example be connected to a piston which can be reciprocated to open or close the switch by the application of air pressure thereto. The time interval between the opening of the circuit breaker and the subsequent opening of the disconnecting switch should be just long enough to ensure that the circuit is definitely interrupted and the arc in the circuit breaker extinguished before the disconnecting switch opens.

This time interval is for all practical purposes the time required for the movable contact of the circuit breaker to be moved to its open circuit position, since by this time the arc will have been completely extinguished and the circuit interrupted.

Fig. 1 shows the condition immediately after the application of air pressure to the circuit breaker, the piston 5b having moved back to separate the contacts to their full extent, the disconnecting switch remaining closed and the spring 7 tending to reclose the circuit breaker. The cam device actuated by the opening movement of the disconnecting switch removes the spring pressure from the contact 5 as described below and shown in Fig. 2 whereupon the air pressure can be cut off the circuit breaker without reclosure of the breaker, the circuit remaining interrupted by both the breaker and the disconnecting switch.

To allow of the removal of the spring pressure the cylinder 6 is slidably mounted in the cylindrical part 1 of the circuit breaker chamber so as to form a movable abutment for the spring 7. Secured to and moving with the switch blade 8 is the sector 8a having therein the cam slot 8b in which works the pin 13 projecting laterally from an extension 6a of the cylinder 6 passing through the closure cap 16 on the end of the circuit breaker chamber. When the disconnecting switch is moved from the position shown in Fig. 1 to the position shown in Fig. 2, the action of the cam slot 8b on the pin 13 withdraws the slidable cylinder 6 as shown to such an extent as to relieve the contact 5 of substantially all the spring pressure so that the latter tends to remain in the open position when the air pressure is cut off.

Figures 4, 5:
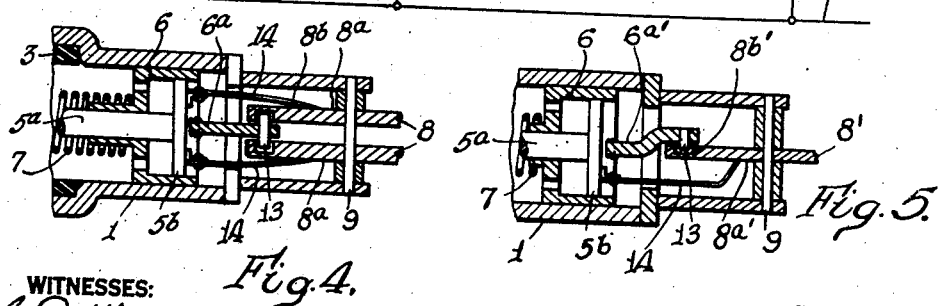
Fig. 4 is a fragmentary sectional view taken substantially along the line IV—IV of Fig. 1.
Fig. 5 is a fragmentary section of a modified construction.

The disconnecting switch is preferably operated by compressed air and may be opened and closed by application of air pressure to opposite sides of the piston. During the first part of the movement of the switch blade 8 and the sector 8a in a direction to reclose the isolating switch, the action of the cam slot 8b on the pin 13 moves the cylinder 6 back from the position shown in Fig. 2 to that shown in Fig. 1, thereby reapplying the pressure of spring 7 to contact 5 and closing the circuit breaker; the circuit is subsequently completed by the closure of the isolating switch. The disconnecting switch is shown as mounted, in part, on the circuit breaker. Blade 8 of the isolating switch may be electrically connected to the movable contact 5 for example in any of the ways long well known for use when a disconnecting switch (not intended, as in the present case, to be opened each time the circuit breaker acts) is combined with and connected in series with a circuit breaker. In the particular arrangement shown, the electrical connection between the contact 5 and the switch blade 8 may comprise one or more brushes 14 extending from the stem 5a out through the cap 16. These brushes bear against the side face or faces of a member forming part of the switch blade and rub over these faces during movement of the piston 5b as the circuit breaker opens and closes. Preferably the hinge end of the switch blade 8 is bifurcated providing two spaced sectors 8a (Fig. 4). The piston 5b which is rigid with the stem 5a is provided with two brushes 14 of resilient conducting material which engage the outer faces of the sectors 8a, as shown in Fig. 4.

If desired, however, the switch blade may have only a single sector 8a', as in Fig. 5, provided with the slot 8b' on one face thereof, in which the pin 13 of the extension 6a' engages. In such instance, the piston 5b is provided with only a single brush 14' which engages the face of the sector 8a' opposite the face having the slot 8b'. This modified construction is shown in Fig. 5.

In the modification shown in Fig. 3, the parts 1, 2, 3, 4, 5, 7, 15 and 16 of the circuit breaker are as already described with reference to Figs. 1 and 2; so also are the parts 8, 9, 10, 11 and 12 of the disconnecting switch. The cylinder 6 in which slides the stem 5a and the piston 5b is, however, fixed within the chamber and may be integral with the part 1 of the chamber or with the end cap 16. Secured to an extension of the stem 5a and passing through the end cap 16 is the sleeve 17 forming a tail-piece to the movable contact unit 5 of the circuit breaker. Pivotally mounted on some part of the circuit breaker structure such as a bracket 18 extending from the circuit breaker chamber is a latch 19 urged towards the sleeve 17 by the spring 20 and cooperating with the bevelled engaging member 21 on the sleeve 17. As the circuit breaker opens on the application of air pressure thereto, the bevelled edge of the front end of the latch 19 rides up the bevelled surface of the engaging member 21, thereby compressing the spring 20. The spring then causes the latch 19 to hook behind the engaging member 21 and hold the contact 5 away from the fixed contact 4—against the pressure of spring 7—when the air pressure is cut off.

The disconnecting switch blade 8 pivoted at 9 is shown in full lines in the switch-closed position. A projection 8c from this blade 8 is adapted to deflect and slip past a pawl on the latch 19 during the opening movement of the disconnecting switch, the blade 8 then coming to the position shown in broken lines. This pawl 22 is shown pivoted on the rear end of the latch 19 and biased by the pressure of the spring 23. During the first part of the reclosing movement of the disconnecting switch the pawl 22 is engaged by the member 8c without being deflected and accordingly the latch 19 is lifted clear of the engaging member 21 to release the moving contact unit 5 of the circuit breaker which accordingly immediately closes under the action of the spring 7. The circuit is finally completed by the closure of the disconnecting switch. The means for making electrical contact between the blade 8 and the sliding tail-piece 17 can be the brushes 14 described with reference to Figs. 1 and 2.

Figure 3:
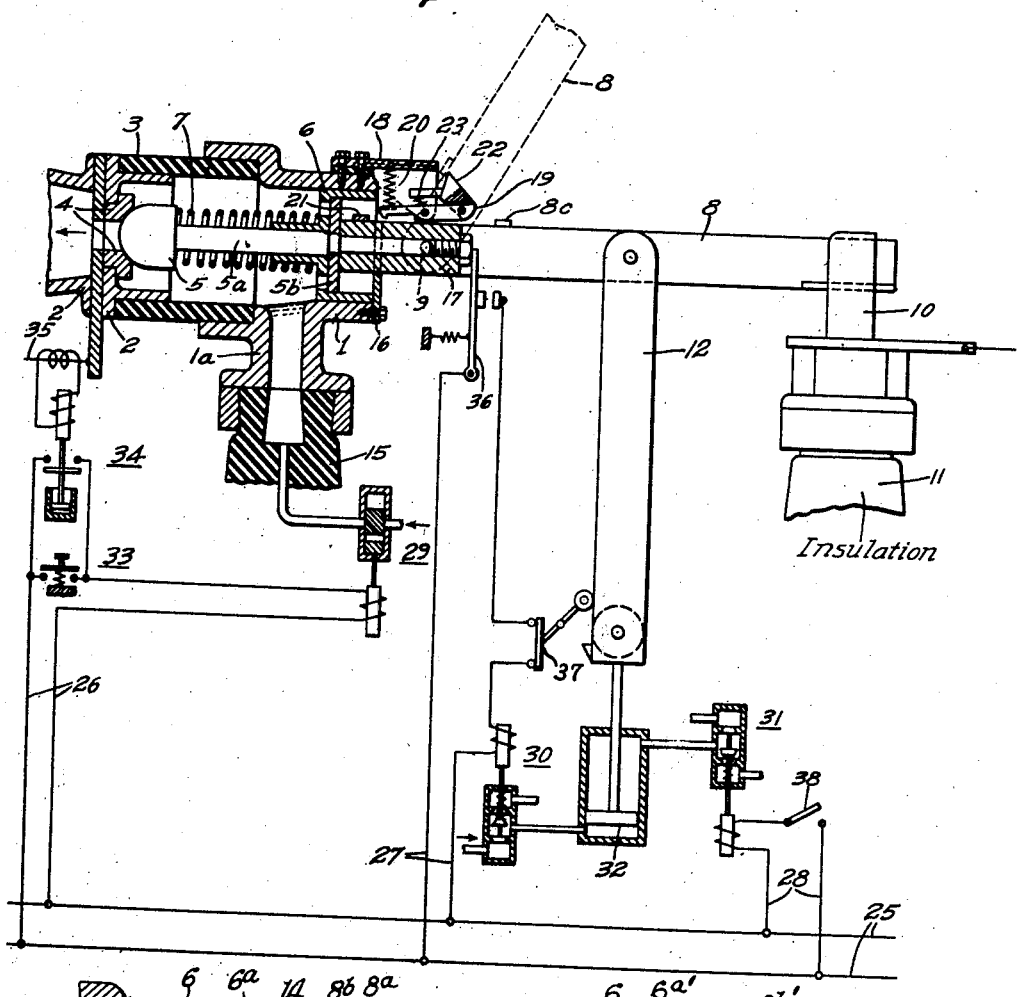
Fig. 3 is a fragmentary view, partly in section, of a circuit breaker and disconnecting switch constructed in accordance with another and preferred embodiment of the invention, the disconnecting switch being shown closed but with the positions of its parts when the switch is open indicated by the dotted lines.

A suitable control system for the switching apparatus is shown schematically in Figs. 1 and 3. A pair of supply lines 25 are connected to a source of electrical energy (not shown), and these lines have branch circuits 26, 27 and 28 connected thereto for energizing the electromagnetically operated valves 29, 30 and 31, which control the circuit breaker and the disconnecting switch. The valves 30 and 31 control the supply of air pressure to the opposite sides of the operating piston 32 of the disconnecting switch, and the valve 29 controls the supply of air pressure to the circuit breaker. Each of the electromagnetically operated valves is biased to a normal inoperative position by a suitable biasing spring.

The branch line 26 has a manually operable switch 33 in series therein for manually controlling energization of the valve 29, and also has an overload responsive switch 34 connected in shunt to the manual switch 33 for energizing the valve 29 to cause opening of the circuit breaker automatically in response to predetermined overload conditions in the main line 35 controlled by the circuit breaker and disconnecting switch. Closing of either of the switches 33 or 34 will effect energization of the valve 29 and cause opening of the circuit breaker.

The branch line 27 has an auxiliary switch 36 connected in series therein for controlling energization of the valve 30 which controls opening of the disconnecting switch. The auxiliary switch 36 is biased open and is arranged to be closed by a movable part of the circuit breaker when the circuit breaker reaches open position to cause automatic opening of the disconnecting switch immediately after each opening operation of the circuit breaker. A limit switch 37 is also connected in series in the branch line 27, and this switch is arranged to open the branch line circuit 27 to deenergize the valve 30 when the disconnecting switch reaches open position to cut off the air pressure.

The branch line 28 has a manual control switch 38 connected in series therein for controlling energization of the valve 31 for causing closing of the disconnecting switch when desired.

While the invention has been disclosed in accordance with the provisions of the patent statutes, it is to be understood that various changes in the structural details may be made without departing from the spirit of the invention. It is desired, therefore, that the language of the appended claims be given the broadest interpretation permissible in the light of the prior art.

I claim as my invention:

1. In combination, a circuit breaker having relatively movable contacts, means biasing said contacts closed to close said breaker, means operable to open said contacts, a disconnecting switch electrically connected in series with said circuit breaker, operating means for opening and closing said switch, means for causing said switch operating means to open said switch immediately after each opening operation of said circuit breaker, and means interconnecting said circuit breaker and switch for preventing closing of said circuit breaker until said switch is moved toward closed position and for causing closing of said circuit breaker during the closing movement of said switch.

2. In combination, a circuit breaker having relatively movable contacts, means biasing said contacts closed to close said breaker, means operable to open said contacts, a disconnecting switch electrically connected in series with said circuit breaker, operating means for opening and closing said switch, means for causing said switch operating means to open said switch immediately after each opening operation of said circuit breaker, and means mechanically interconnecting said circuit breaker and switch for preventing closing of said circuit breaker until said switch is moved toward closed position and for causing closing of said circuit breaker during the closing movement of said switch.

3. In combination, a fluid blast circuit breaker having relatively movable contacts, spring means biasing said contacts closed, means for opening said contacts, and means for causing a blast of fluid through the arc drawn by said contacts to extinguish the same, a disconnecting switch electrically connected in series with said circuit breaker and having operating means for opening and closing said switch, means for causing said switch operating means to open said switch immediately following interruption of the circuit by said circuit breaker, and means interconnecting said circuit breaker and switch for causing closing of said circuit breaker during the closing movement of said switch and prior to closing of the circuit by said switch.

4. In combination, a fluid blast circuit breaker having relatively movable contacts, means biasing said contacts closed to close the breaker, means for opening said contacts, and means for causing a blast of fluid through the arc drawn by said contacts to extinguish the same, a disconnecting switch electrically connected in series with said breaker having operating means for opening and closing said switch, means for causing said switch operating means to open said switch immediately following interruption of the circuit by said circuit breaker, and means mechanically interconnecting said circuit breaker and switch for preventing closing of said circuit breaker until said switch is moved towards closed position and for causing closing of said circuit breaker during the closing movement of said switch.

5. In combination, a fluid blast circuit breaker having relatively movable contacts, means biasing said contacts closed, fluid pressure means for opening said contacts, a disconnecting switch electrically connected in series with said breaker, means for causing opening of said switch immediately after each opening operation of said circuit breaker, and means mechanically interlocking said breaker and switch for preventing closing of said circuit breaker until said switch is moved towards closed position and for causing closing of said circuit breaker during the closing movement of said switch.

6. In combination, a fluid blast circuit breaker having relatively movable contacts, means biasing said contacts closed to close the breaker, fluid pressure means for opening said contacts and for causing a blast of fluid through the arc drawn by said contacts to extinguish the arc, a disconnecting switch electrically connected in series with said breaker, operating means for opening and closing said switch, means for causing said switch operating means to open said switch immediately following each interruption of the circuit by said circuit breaker, and means mechanically interconnecting the circuit breaker and switch mechanism for preventing closing of said breaker until said switch is moved towards closed position and for causing closing of said circuit breaker during the closing movement of said switch.

7. In combination, a disconnecting switch comprising a contact member, a blade means movable into and out of engagement with said contact member, means for supporting said switch, operating means for opening and closing said switch, a fluid blast circuit interrupter mounted on said supporting means and electrically connected in series with said switch, said circuit interrupter having relatively movable contacts, spring means biasing said contacts closed and means for opening said contacts, means for causing said switch operating means to open said switch immediately following each interruption of the circuit by said interrupter, and means mechanically interconnecting said interrupter and switch for preventing closing of said interrupter until said switch is moved towards closed position and for causing closing of said interrupter during the closing movement of said switch.

8. In combination, a circuit breaker having relatively movable contacts, spring means biasing said contacts closed, means for opening said contacts, latch means for releasably holding said contacts open, a disconnecting switch electrically connected in series with said breaker, means for opening and closing said switch, means for causing said switch operating means to open said switch immediately following opening of said circuit breaker, and means operable upon closing movement of said switch for releasing said latch means to cause closing of said circuit breaker.

9. In switching apparatus for interrupting an electrical circuit, a circuit breaker having relatively movable contacts, spring means for applying a force to close said contacts, and means for opening said contacts, a disconnecting switch electrically connected in series with said breaker, independent operating means for opening said switch after opening of said breaker and for reclosing said switch at will, and means mechanically actuated by said switch for relieving the circuit breaker contacts of the spring pressure when said switch is open to prevent closing of said breaker and for reapplying the spring pressure during the closing movement of said switch.

10. In switching apparatus for interrupting an electrical circuit, a circuit breaker having relatively movable contacts enclosed in a chamber, spring means for applying a pressure to close said contacts, fluid pressure means for opening said contacts and for extinguishing the arc drawn by said contacts, a disconnecting switch electrically connected in series with said circuit breaker, independent operating means for opening said switch after opening of said breaker and for reclosing said switch at will, and means mechanically actuated by said switch for relieving said breaker contacts of spring pressure to prevent closing of said breaker until the switch is moved toward closed position and for reapplying the spring pressure to said contacts during closing movement of the switch to reclose said breaker before the switch closes.

11. Switching apparatus for interrupting an electrical circuit comprising in combination a circuit breaker having relatively movable contacts, spring means for closing said contacts, means for opening said contacts, latch means for holding said contacts open after the opening force has been removed, a disconnecting switch electrically connected in series with said breaker, independent operating means for opening said switch after opening of said circuit breaker and for reclosing said switch at will, and means mechanically moving with said switch operable to release said latch means during the initial closing movement of said switch to cause closing of said circuit breaker before said switch is closed.

12. Switching apparatus for interrupting an electrical circuit comprising in combination, a circuit breaker having relatively movable contacts enclosed in a chamber, spring means biasing said contacts closed, and fluid pressure means for opening said contacts and for extinguishing the arc drawn by said contacts, latch means for releasably holding said breaker open after the opening force is removed, a disconnecting switch electrically connected in series with said breaker, independent operating means for opening said switch immediately after opening of said circuit breaker and for reclosing said switch at will, and means mechanically moving with said switch for releasing said latch means during the initial closing movement of said switch to cause closing of said circuit breaker before said switch is closed.

13. In combination, a fluid blast circuit breaker having relatively movable contacts, spring means biasing said contacts closed, means for opening said contacts, means for causing a blast of fluid through the arc drawn by said contacts to extinguish the same, and latch means for releasably holding said contacts open, a disconnecting switch electrically connected in series with said breaker, operating means for opening and closing said switch, means for causing said switch operating means to open said switch following interruption of the circuit by said breaker, and means movable with said switch for releasing said latch means during the initial closing movement of said switch to cause closing of said circuit breaker before said switch is closed.

14. Electrical switching apparatus comprising at least one pair of circuit interrupting contacts, spring means for biasing and actuating said interrupting contacts closed, a movable disconnecting contact connected in series in the circuit with said interrupting contacts, operating mechanism for said contacts operable to cause opening of said interrupting contacts immediately followed by movement of said disconnecting contact to open position after the circuit has been interrupted by said interrupting contacts, and operable during a circuit closing operation to cause closing of said interrupting contacts during the closing movement of said disconnecting contact to closed position but before said disconnecting contact reaches closed position and the circuit is completed.

15. Electrical switching apparatus comprising at least one pair of circuit interrupting contacts, operating mechanism for said contacts adapted to be energized from a source of power to actuate said contacts, a movable disconnecting contact connected in series in the circuit with said interrupting contacts, a separate operating mechanism connected to said disconnecting contact adapted to be energized by a source of power to actuate said disconnecting contact to open and to closed position, means operable to energize the operating mechanism of said disconnecting contact to open said disconnecting contact after each opening operation of said circuit interrupting contacts, and means controlled by said disconnecting contact operating mechanism for maintaining said interrupting contacts open while said disconnecting contact is in open position and for causing closing of said interrupting contacts during the closing movement of said disconnecting contact before said disconnecting contact reaches closed position and the circuit is completed.

16. In combination, a circuit breaker having relatively movable contacts, operating mechanism connected to the movable contact adapted to be energized by a source of power to actuate said contact, a disconnecting switch electrically connected in series with said breaker, separate operating mechanism for said switch adapted to be energized by the source of power to actuate said switch to open and to closed position, means for energizing said switch operating mechanism to open said switch immediately after opening operation of the circuit breaker contacts, and interlocking means for causing said circuit breaker operating mechanism to close said circuit breaker contacts during the closing movement of said switch before said switch reaches closed position.

17. Electrical switching apparatus comprising a pair of circuit interrupting contacts, operating mechanism for opening and closing said contacts comprising a fluid pressure actuated piston operatively related to the movable contact, a pair of disconnecting contacts electrically connected in series with said interrupting contacts, operating mechanism for said disconnecting contacts comprising a second fluid pressure actuated piston operatively related to the movable disconnecting contact, means for causing said disconnecting contact operating mechanism to open said disconnecting contacts after interruption of the circuit by said interrupting contacts during a circuit opening operation of the switching apparatus, said interrupting contacts remaining open after opening therof until a closing operation of the switching apparatus is initiated, and means for causing said interrupting contacts to close prior to completion of the circuit by said disconnecting contacts during a closing operation of the switching apparatus.

18. Electrical switching apparatus comprising a circuit interrupter having relatively movable contacts, operating mechanism for the circuit interrupter adapted to be energized by a source of power to actuate said contacts, a disconnecting switch electrically connected in series with said circuit interrupter, separate operating mechanism for said switch adapted to be energized by a source of power to actuate said switch to open and to closed position, means for causing said switch operating mechanism to open said switch after interruption of the circuit by said circuit interrupting contacts, said circuit interrupting contacts remaining open after opening thereof until closing operation of the switching apparatus is initiated, and means operable during closing movement of said disconnecting switch for causing the circuit interrupter operating mechanism to close said circuit interrupting contacts during the closing movement of the switch before said switch reaches closed position.

19. Electrical switching apparatus comprising a circuit interrupter having relatively movable contacts enclosed in a chamber, operating mechanism for said contacts including a fluid pressure actuated piston operatively related to said contacts for actuating said contacts, means for causing a blast of fluid through the arc drawn by said contacts upon separation thereof, said contacts remaining open after opening thereof until a closing operation of the switching apparatus is initiated, a pair of disconnecting contacts electrically connected in series with said circuit interrupting contacts, separate operating mechanism for said disconnecting contacts comprising a second fluid pressure actuated piston operable to open and to close said disconnecting contacts, means for causing said disconnecting contact operating piston to actuate said disconnecting contacts to open position after opening of said circuit interrupting contacts, and means for causing said circuit interrupter operating mechanism to close said interrupting contacts prior to the time that the disconnecting contact operating mechanism closes the disconnecting contacts upon closing operation of the switching apparatus.

A. R. BLANDFORD.